(12) United States Patent
Chang et al.

(10) Patent No.: US 12,058,757 B2
(45) Date of Patent: Aug. 6, 2024

(54) USER EQUIPMENT AND PRE-CONFIGURED UPLINK RESOURCE TRANSMISSION METHOD PERFORMED THEREBY

(71) Applicant: SHARP KABUSHIKI KAISHA, Sakai (JP)

(72) Inventors: Ningjuan Chang, Shanghai (CN); Renmao Liu, Shanghai (CN)

(73) Assignee: SHARP KABUSHIKI KAISHA, Sakai (JP)

(*) Notice: Subject to any disclaimer, the term of this patent is extended or adjusted under 35 U.S.C. 154(b) by 367 days.

(21) Appl. No.: 17/441,951

(22) PCT Filed: Mar. 26, 2020

(86) PCT No.: PCT/CN2020/081380
§ 371 (c)(1),
(2) Date: Sep. 22, 2021

(87) PCT Pub. No.: WO2020/192730
PCT Pub. Date: Oct. 1, 2020

(65) Prior Publication Data
US 2022/0167452 A1 May 26, 2022

(30) Foreign Application Priority Data
Mar. 27, 2019 (CN) .......................... 201910242025.5

(51) Int. Cl.
*H04W 76/19* (2018.01)
*H04W 12/041* (2021.01)
(Continued)

(52) U.S. Cl.
CPC ......... *H04W 76/19* (2018.02); *H04W 12/041* (2021.01); *H04W 36/08* (2013.01); *H04W 76/20* (2018.02)

(58) Field of Classification Search
None
See application file for complete search history.

(56) References Cited

U.S. PATENT DOCUMENTS 10,667,323 B1 * 5/2020 Shih ...................... H04W 76/27
2020/0170069 A1 * 5/2020 Shih ...................... H04W 76/19
(Continued)

OTHER PUBLICATIONS

Qualcomm Incorporated et al., "Introduction of EDT for eMTC and NB-IoT enhancements", R2-1813091 GPP TSG-RAN2 Meeting #103, Gothenburg, Sweden, Aug. 20, 2018-Aug. 24, 2018 (Year: 2018).*

(Continued)

*Primary Examiner* — Faiyazkhan Ghafoerkhan
(74) *Attorney, Agent, or Firm* — ScienBiziP, P.C.

(57) ABSTRACT

The present invention provides user equipment and a pre-configured uplink resource transmission method performed thereby. The pre-configured uplink resource transmission method performed by user equipment comprises the following steps: when upper layer data arrives at an access stratum of the UE, a Radio Resource Control (RRC) layer triggering an RRC procedure to confirm whether a condition for pre-configured uplink resource transmission is met, and if so, performing, by the RRC layer, an operation of pre-configured uplink resource data transmission; and when using a pre-configured uplink resource transmission mode, a Medium Access Control (MAC) layer verifying whether a pre-configured uplink resource is available, and if not, performing, by the UE, fallback to a data transmission mode in which pre-configured uplink resource data transmission is not used, so as to transmit the uplink data.

2 Claims, 4 Drawing Sheets

(51) Int. Cl.
*H04W 36/08* (2009.01)
*H04W 76/20* (2018.01)

(56) References Cited

U.S. PATENT DOCUMENTS

2021/0204192 A1* 7/2021 Lee .................... H04L 67/62
2021/0337588 A1* 10/2021 Lee .................... H04W 72/23
2022/0167452 A1* 5/2022 Chang ............... H04W 74/0833

OTHER PUBLICATIONS

Intel Corporation, "Capture NR agreements into 36.331 for E-UTRA connected to 5GC", R2-1813139 3GPP TSG-RAN2 Meeting #103, Gothenburg, Sweden, Aug. 20-24, 2018.

Qualcomm Incorporated et al., "Introduction of EDT for eMTC and NB-IoT enhancements", R2-1813091 3GPP TSG-RAN2 Meeting #103, Gothenburg, Sweden, Aug. 20, 2018-Aug. 24, 2018.

3GPP TS 36.331 V15.4.0 (Dec. 2018) 3rd Generation Partnership Project; Technical Specification Group Radio Access Network; Evolved Universal Terrestrial Radio Access (E-UTRA); Radio Resource Control (RRC); Protocol specification (Release 15).

Ericsson, "Revised WID: Additional MTC enhancements for LTE", RP-181878 3GPP TSG RAN Meeting #81, Gold Coast, Australia, Sep. 10-13, 2018.

Ericsson, Huawei, "New WID on Rel-16 enhancements for NB-IoT", RP-181451 3GPP TSG RAN Meeting #80, La Jolla, USA, Jun. 11-14, 2018.

Sierra Wireless, "LTE-M Pre-configured UL Resources Design Considerations", R1-1812724 3GPP TSG RAN WG1 Meeting #95, Spokane, USA, Nov. 12-16, 2018.

Huawei, Hisilicon, "Further topics for transmission in preconfigured UL resources", R1-1813762 3GPP TSG RAN WG1 Meeting #95, Spokane, USA, Nov. 12-16, 2018.

Samsung, "Discussion on transmission in preconfigured UL resources for MTC", R1-1812940 3GPP TSG RAN WG1 Meeting #95, Spokane, USA, Nov. 12-16, 2018.

* cited by examiner

USER EQUIPMENT AND PRE-CONFIGURED UPLINK RESOURCE TRANSMISSION METHOD PERFORMED THEREBY

TECHNICAL FIELD

The present disclosure relates to the field of wireless communication technologies, and more specifically, the present disclosure relates to user equipment and a transmission method using a pre-configured uplink resource performed thereby.

BACKGROUND

In June 2018, a new work item on Release 16 of further enhancements for the NarrowBand Internet of Things (NB-IoT) Project (see RP-181451: New WID on R16 enhancement for NB-IoT) and a new work item on Release 16 of the further enhancement for Machine Type Communication (MTC) (see RP-181878, Revised WID for additional MTC enhancement) were approved at the 3rd Generation Partnership Project (3GPP) RAN #80 plenary meeting. One of the goals of this research project is to improve the efficiency of uplink transmission to reduce the power consumption of User Equipment (UE).

In the prior art, if UE in an idle state intends to transmit uplink data, there are two ways: one way is to enter a Radio Resource Control (RRC) connected state through an RRC connection establishment/resume procedure, that is, uplink data is transmitted in an RRC connected state where a connection to a network side is established (this transmission mode is referred to as a conventional transmission mode or a conventional data transmission mode in the present disclosure); and the other way is to utilize an Early Data Transmission (EDT) mechanism introduced in Release 15, in which small data packets are transmitted to a base station together in a third message in a random access procedure. For small data packets, using the EDT mode can obviously reduce signaling overheads and consume less UE power than entering the RRC connected state first and then transmitting uplink data. In the aforementioned Release 16, it is desired to further improve the efficiency of uplink transmission and reduce the power consumption of the UE. In the ongoing technical discussion on improving the uplink transmission efficiency to reduce the UE power consumption, a feasible method is to pre-allocate available uplink resources for a user in an RRC idle state. When the UE has uplink data arriving, if an uplink thereof is still in a synchronized state (that is, there is a valid uplink Time Advance (TA)), uplink transmission can be completed with the pre-allocated uplink resources, without the need to perform uplink transmission through a random access procedure or through an RRC connection establishment/resume procedure to enter an connected state to transmit uplink data.

In the present disclosure, the manner in which the UE in an RRC idle state transmits uplink data by using pre-configured resources is referred to as pre-configured uplink resource transmission. The present disclosure mainly proposes solutions to the issue of how to perform pre-configured uplink resource transmission, and more specifically, proposes solutions to the issue of how to fall back from a pre-configured uplink resource transmission mode to a conventional uplink data transmission mode or an EDT mode and the issue of pre-configured uplink resource transmission in a mobility scenario, and the issue of configuration of a pre-configured uplink resource.

SUMMARY

The present disclosure is accomplished in view of the above issues, with the purpose of providing user equipment and a pre-configured uplink resource transmission method performed thereby capable of improving the efficiency of uplink transmission to reduce the power consumption of the user equipment.

According to one aspect of the present invention, provided is a pre-configured uplink resource transmission method performed by User Equipment (UE), comprising the following steps: when upper layer data arrives at an access stratum of the UE, a Radio Resource Control (RRC) layer triggering an RRC procedure to confirm whether a condition for pre-configured uplink resource transmission is met, and if so, performing, by the RRC layer, an operation of pre-configured uplink resource data transmission; and when using a pre-configured uplink resource transmission mode, a Medium Access Control (MAC) layer verifying whether a pre-configured uplink resource is available, and if not, performing, by the UE, fallback to a data transmission mode in which the pre-configured uplink resource data transmission is not used, so as to transmit uplink data.

In the foregoing pre-configured uplink resource transmission method performed by user equipment, preferably, the fallback is performed at the MAC layer of the UE or determined by the RRC layer of the UE.

In the foregoing pre-configured uplink resource transmission method performed by user equipment, preferably, when the fallback is performed at the MAC layer of the UE, the MAC layer triggers a random access procedure, and the random access procedure is a random access procedure that does not use Early Data Transmission (EDT).

In the foregoing a pre-configured uplink resource transmission method performed by user equipment, preferably, when the fallback is performed at the MAC layer of the UE, the procedure in which the MAC layer triggers a random access procedure is as follows: if the size of a latent MAC protocol data unit is not greater than an EDT transport block size configuration corresponding to a selected coverage enhancement level for EDT received in system information, the MAC layer initiates a random access procedure for EDT; otherwise, the MAC layer initiates a random access procedure that does not use EDT.

In the foregoing a pre-configured uplink resource transmission method performed by user equipment, preferably, when the fallback is determined by the RRC layer of the UE, the following steps are comprised: if the MAC layer determines that the pre-configured uplink resource is unavailable, the MAC layer transmits to the RRC layer a pre-configured uplink resource transmission cancellation indication for informing that the pre-configured uplink resource is unavailable; and upon receiving the pre-configured uplink resource transmission cancellation indication from the MAC layer, the RRC layer determines whether an EDT condition is met, and if so, the RRC layer configures an lower layer to use EDT; otherwise, the RRC layer performs an operation of falling back to a conventional transmission mode.

In the foregoing pre-configured uplink resource transmission method performed by user equipment, preferably, if the MAC layer initiates a random access procedure for EDT, the MAC layer transmits to an upper layer indication information for informing the upper layer that the EDT mode is currently being used.

In the foregoing pre-configured uplink resource transmission method performed by user equipment, preferably, the MAC layer determines that the pre-configured uplink resource is unavailable in any one of the following situations: the MAC layer determines that there is no pre-configured uplink resource corresponding to a current coverage enhancement level; the MAC layer determines that the size of a latent MAC protocol data unit is greater than the size of a transport block corresponding to the allocated pre-configured uplink resource; a timer used to determine that an idle state Time Advance (TA) times out; an idle state TA determined based on Reference Signal Received Power (RSRP) is invalid; the uplink data transmitted on the pre-configured uplink resource encounters a transmission failure; and the count of failures for transmitting the uplink data on the pre-configured uplink resource exceeds a configured threshold.

In the foregoing pre-configured uplink resource transmission method performed by user equipment, preferably, the operation of the RRC layer performing fallback to the conventional transmission mode comprises one or a plurality of the following operations: if the fallback operation corresponds to an RRC early data request message, initiating transmission of an RRC connection request message; if the fallback operation corresponds to an RRC connection resume request message, re-establishing a Radio Link Control (RLC) layer corresponding to a Data Radio Bearer (DRB) and/or a Signaling Radio Bearer (SRB); if the fallback operation corresponds to the RRC connection resume request message, re-establishing a Packet Data Convergence Protocol (PDCP) layer corresponding to the DRB and/or the SRB; if the fallback operation corresponds to the RRC connection resume request message, deleting a security key derived in the RRC procedure; if the fallback operation corresponds to the RRC connection resume request message, suspending all SRBs and DRBs; if the fallback operation corresponds to the RRC connection resume request message, configuring a lower layer to suspend integrity protection and encryption functions; and initiating transmission of the RRC connection resume request message, the RRC connection resume request message being not used for EDT.

In the foregoing pre-configured uplink resource transmission method performed by user equipment, preferably, the conventional transmission mode is entering an RRC connected state through an RRC connection establishment/resume procedure, that is, a mode of transmitting uplink data in the RRC connected state where a connection is established with a network side.

According to another aspect of the present invention, provided is user equipment, comprising: a processor; and a memory storing instructions, wherein the instructions, when run by the processor, cause the user equipment to perform the pre-configured uplink resource transmission method described above.

According to the user equipment and the pre-configured uplink resource transmission method performed thereby involved in the present disclosure, it is possible to fall back from a pre-configured uplink resource transmission mode to a conventional uplink data transmission mode or an EDT mode, and address the issue of the pre-configured uplink resource transmission in a mobility scenario and the issue of configuration of the pre-configured uplink resource, thereby improving the efficiency of uplink transmission and reducing the power consumption of the user equipment.

BRIEF DESCRIPTION OF DRAWINGS

The above and other features of the present disclosure will become more apparent with the following detailed description in conjunction with the accompanying drawings.

DETAILED DESCRIPTION

Figure 1:
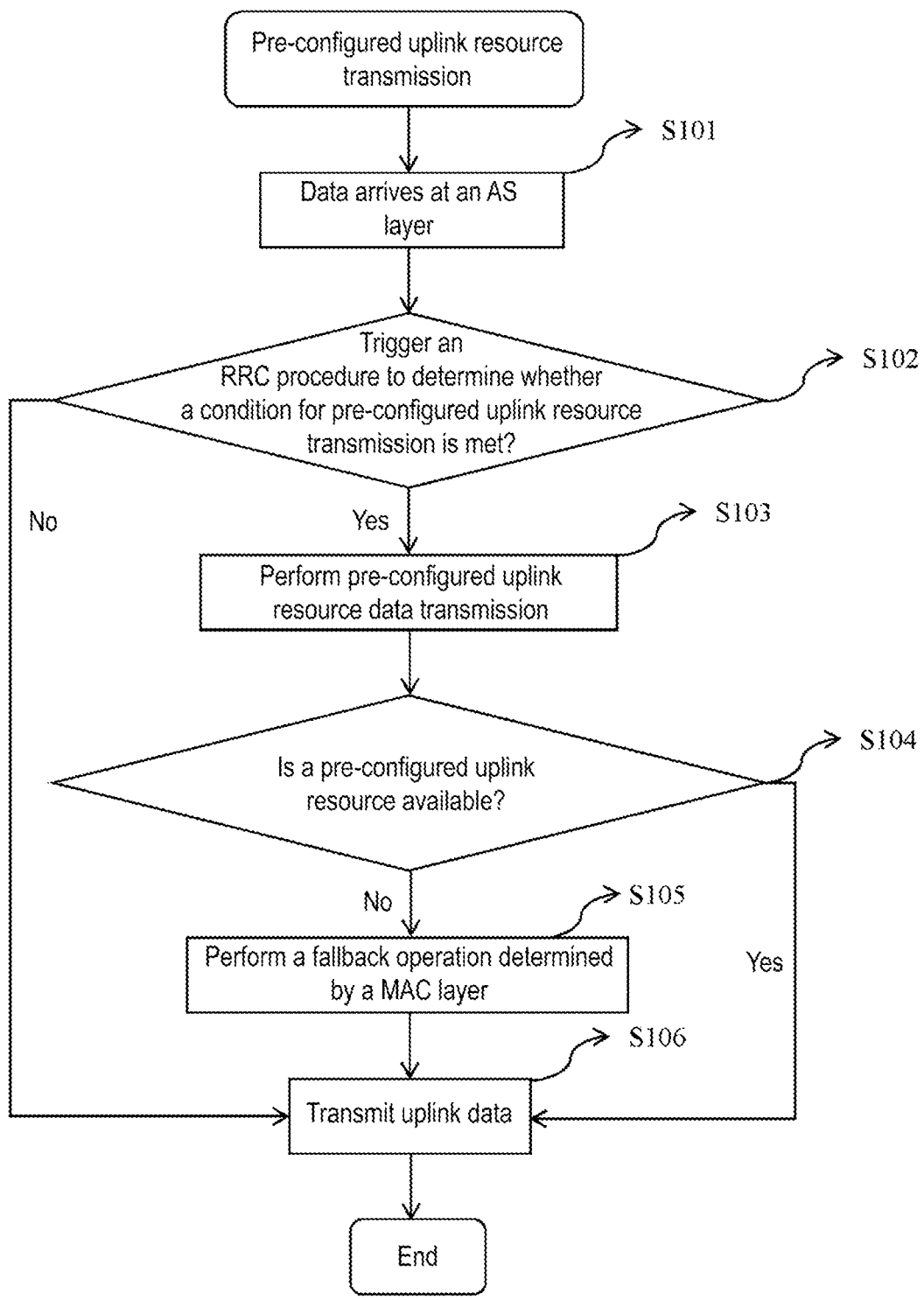
FIG. 1 is a flowchart of pre-configured uplink resource transmission on UE involved in Embodiment 1 of the present disclosure.

According to the following detailed description of exemplary embodiments of the present disclosure made in conjunction with the accompanying drawings, other aspects, advantages, and prominent features of the present disclosure will become apparent to those skilled in the art.

In the present disclosure, the terms "include" and "comprise" and derivatives thereof mean inclusion without limitation; the term "or" may have an inclusive meaning and means and/or.

In the present specification, the following various embodiments for describing the principles of the present disclosure are merely illustrative, and should not be interpreted in any way as limiting the scope of the disclosure. The following description with reference to the accompanying drawings is used to facilitate full understanding of the exemplary embodiments of the present disclosure defined by the claims and equivalents thereof. The following description includes a variety of specific details to facilitate understanding, but these details should be considered merely exemplary. Therefore, those of ordinary skill in the art should recognize that various changes and modifications may be made to the embodiments described herein without departing from the scope and spirit of the present disclosure. In addition, the description of the known function and structure is omitted for clarity and simplicity. In addition, the same reference numerals are used for similar functions and operations throughout the accompanying drawings.

A plurality of embodiments according to the present disclosure are specifically described below by using an NB-IoT in a Long Term Evolution (LTE) mobile communication system and subsequent evolved versions thereof as an exemplary application environment. However, it should be noted that the present disclosure is not limited to the following embodiments, and may be applied to other wireless communication systems such as a Machine Type Communication (MTC) system, and may also be applied to a 5G next-generation wireless communication system (New Radio, NR).

The base station in the present disclosure may be a base station of any type, such as a Node B, an enhanced base station eNB, a base station gNB in a 5G communication system, a micro base station, a pico base station, a macro base station, or a home base station; and the cell in the present disclosure may also be a cell covered by any type of base station described above. In the present disclosure, if not specified, a coverage enhancement level is equivalent to an enhanced coverage level, or may also be referred to as a repetition level. An idle state (RRC Idle) of UE may also be an inactive state (RRC Inactive) of the UE in an NR system.

Different embodiments may also be combined to operate.

Some concepts involved in the present disclosure are described below. It is worth noting that some names in the following description are merely exemplary and illustrative and not limiting, and other names may be used.

Message 3: uplink data transmitted on an uplink resource corresponding to an uplink grant carried in a random access response in a random access procedure, also referred to as Physical Uplink Shared Channel (PUSCH) transmission scheduled by the random access response.

Early Data Transmission (EDT):

The small data transmission optimization scheme in R15 further optimizes the characteristics of small data transmission from a control plane and a user plane. For uplink data transmission, optimization mainly involves small data transmission along with Message 3 in a random access procedure. compared with a conventional data transmission method, such optimization method can complete data transmission at an earlier moment, and thus is referred to as early data transmission. In the present disclosure, small data (or small packet) may be equivalent to early data. In EDT, it is allowed to perform uplink data transmission in a random access procedure, which may further be optionally followed by downlink data transmission subsequently. When uplink data is received, a network side and a UE side will establish or resume an S1 connection, and the S1 connection may be released or suspended along with the aforementioned downlink data transmission.

Enhanced Coverage Level:

The degree to which coverage needs to be enhanced is divided into a plurality of enhanced coverage levels in the coverage enhancement technology; for example, three enhanced coverage levels are defined in NB-IoT. In MTC, four enhanced coverage levels are defined. In some enhanced coverage methods, each enhanced coverage level can correspond to a set of different wireless parameter configurations, such as a random access configuration (such as Physical Random Access Channel (PRACH) resources). When a Medium Access Control (MAC) layer of the UE initiates random access, the MAC layer will determine an enhanced coverage level of the UE according to a measured Reference Signal Received Power (RSRP) and an RSRP threshold used to determine the enhanced coverage level received in system information, and select corresponding random access resources (such as a preamble) and parameters (such as a random access response window size) according to the determined enhanced coverage level to initiate a random access procedure.

Control plane optimization scheme: fully referred to as control plane cellular IoT Evolved Packet System (EPS) optimization, which refers to a method of effectively transmitting user data on a control plane via a mobility management entity without triggering establishment of a Data Radio Bearer (DRB).

User plane optimization scheme: fully referred to as user plane cellular IoT evolved packet system optimization, which refers to support for changing from an EPS mobility management idle state to an EPS mobility management connected state without using a service request procedure.

For pre-configured uplink resources, there may be two forms: one is a dedicated pre-configured uplink resource, that is, a dedicated uplink resource is pre-allocated for UE so that uplink data transmission does not cause collisions, and the other is a shared pre-configuration uplink resource, that is, the allocated uplink resource is shared by a plurality of pieces of UE, which may be a shared resource pool. In this way, the plurality of pieces of UE may use one resource to transmit uplink data, which may cause conflicts and cause transmission failures due to potential contention. Currently, the conclusion reached at 3GPP meeting is to support the allocation of dedicated pre-configured uplink resources for UE through RRC dedicated signaling, and whether to support the sharing of pre-configured uplink resources has not been determined. The pre-configured uplink resource is an uplink resource pre-allocated to the UE by using an RRC message. The pre-configured uplink resource may be allocated in an RRC connected state and used for uplink data transmission when the UE is in an RRC idle state and/or used for the RRC connected state; this mode is usually used for dedicated pre-configured uplink resources. The UE may also be informed, by using system information, of the pre-configured uplink resource for uplink data transmission in the RRC idle state; this mode is usually used for shared pre-configured uplink resources. Unless otherwise specified, in the present disclosure, the pre-configured uplink resource may refer to either a dedicated pre-configured uplink resource or a shared pre-configured uplink resource.

For the dedicated pre-configured uplink resource, the dedicated pre-configured uplink resource may be configured by a base station through RRC dedicated signaling when the UE was previously in an RRC connected state, such as an RRC connection release message, RRC connection reconfiguration information, an RRC connection establishment message, an RRC connection resume message, etc. When the UE in an RRC idle state uses the pre-configured uplink resource to transmit uplink data, if it is determined that the allocated pre-configured uplink resource is unavailable, for example, if transmission fails on the pre-configured uplink resource or the count of transmission failures exceeds a certain threshold, the UE will fall back to a conventional data transmission mode or an EDT mode, that is, the data is not transmitted using the pre-configured uplink resource transmission mode. In this case, how to fall back to the conventional transmission mode or EDT mode has become a concern of the present disclosure.

Considering that the UE using the pre-configured uplink resource can have certain mobility, when the UE is in the procedure of data transmission using the pre-configured uplink resource, if cell reselection occurs at this time, how the UE handle the current data transmission has also become a concern of the present disclosure.

In addition, the RAN 2 105th meeting reached the following consensus: UE can transmit pre-configured uplink resource request information to a base station to request the base station to allocate a pre-configured uplink resource therefor and provide some auxiliary information to the base station for reference by the base station during allocation of the pre-configured uplink resource. The auxiliary information may include a transport block size, a pre-configured uplink resource period, a channel quality condition, etc. In the pre-configured uplink resource mechanism based on UE request, consider a situation: due to mobility or network load balancing, a serving base station of the UE triggers a handover preparation procedure with a target by transmitting a handover request message. If the UE transmits pre-configured uplink resource request information to the serving base station thereof and the UE subsequently receives a handover command and the handover occurs, the target base station cannot obtain the latest pre-configured uplink resource request information of the UE. The following embodiments also propose a solution in response to this problem.

In the following embodiments of the present disclosure, indicate/indication and notify/notification or inform/information can be interchanged. UE can refer to NB-IoT UE, Bandwidth-reduced Low-complexity (BL) UE, UE in enhanced coverage, or other UE such as 5G NR UE. In the present disclosure, Physical Random Access Channel (PRACH), Narrowband Physical Random Access Channel (NPRACH), and Random Access Channel (RACH) can be interchanged. Physical Downlink Control Channel (PDCCH) is equivalent to Narrowband Physical Downlink Control Channel (NPDCCH) or MTC Physical Downlink Control Channel (MPDCCH). In the present disclosure, the pre-configured uplink resource may also be referred to as a pre-configured uplink grant or a preallocated uplink resource or a preallocated uplink grant or an idle state semi-persistent scheduling grant, etc. The pre-configured uplink resource request information is also referred to as pre-configured uplink resource auxiliary information or a pre-configured uplink resource request or pre-configured uplink resource information. When a protocol stack is described, a lower layer is also referred to as an bottom layer, and an upper layer is also referred to as a higher layer. The initiation may also be referred to as initialization.

Embodiment 1

Below, FIG. 1 is used to describe a procedure of pre-configured uplink resource transmission on UE, as follows:

1. When upper layer data arrives at an Access Stratum (AS) layer of the UE (step S101), an RRC layer triggers an RRC procedure, such as an RRC connection establishment procedure. In this procedure, the UE RRC layer determines whether a condition for pre-configured uplink resource transmission is met (step S102); if so, the RRC layer performs an operation of Pre-configured Uplink Resource (PUR) data transmission (step S103). Optionally, the method further includes instructing a lower layer to use the pre-configured uplink resource transmission mode, or described as configuring a lower layer to use the pre-configured uplink resource transmission.

The condition for the pre-configured uplink resource transmission may be one or a plurality of the following: the UE has a stored pre-configured uplink resource configuration; a serving cell where the UE currently camps is the same as a serving cell when the UE previously receiving the pre-configured uplink resource configuration, that is, the serving cell that configures the pre-configured uplink resource and the serving cell that the pre-configured uplink resource transmission is initiated to are the same cell; and an establishment or resume request is used for a mobile originating call and a cause for establishment is mobile originating data (MO-data) or mobile originating exception data (MO-exception data) or delay tolerant access (delaytolerantAccess). The operation of the pre-configured uplink resource data transmission performed by the RRC layer includes one or a plurality of the following operations: if the UE is initiating a control plane mode (referred to as control plane pre-configured uplink resource transmission), the UE initiates transmission of an RRC connection establishment request message or an RRC early data request; if the UE is initiating a user plane mode (referred to as user plane pre-configured uplink resource transmission), that is, the UE is resuming an RRC connection, the UE initiates transmission of an RRC connection resume request message. The initiating transmission of the RRC connection establishment request message or the RRC early data request message includes including the data/information received from the upper layer in the RRC connection establishment request or the RRC early data request message, and further in a dedicatedInfoNAS information element. The initiating transmission of the RRC connection resume request message, the same as an operation of initiating an RRC connection resume request message for early data transmission in an existing mechanism (see section 5.3.3.3a of the protocol specification 36.331), includes restoring a Packet Data Convergence Protocol (PDCP) status; re-establishing PDCP entities corresponding to all Signaling Radio Bearers (SRBs) and Data Radio Bearers (DRBs); instructing the lower layer to use a stored UE access stratum context; resuming all the SRBs and DRBs; deriving new keys; and resuming security.

2. When using the pre-configured uplink resource transmission mode, the UE MAC layer verifies whether the pre-configured uplink resource is valid (step S104); if not, the UE performs fallback to a conventional data transmission mode in which pre-configured uplink resource data transmission is not used (step S105), so as to transmit the uplink data (step S106).

In this embodiment, the fallback is performed at the MAC layer of the UE. That is, if the MAC layer determines that the pre-configured uplink resource is invalid, the UE MAC layer triggers a random access procedure, which is a conventional random access procedure, that is, a random access procedure that does not use EDT. The MAC layer may determine that the pre-configured uplink resource is unavailable in any one of the following situations:

Situation 1: The UE MAC layer determines that there is no pre-configured uplink resource corresponding to a current coverage enhancement level. In this situation, configuration of the pre-configured uplink resource distinguishes among coverage enhancement levels, that is, different pre-configured uplink resources may be configured for different coverage enhancement levels. The UE determines, on the basis of measured RSRP, a coverage enhancement level at which the UE currently is. An RSRP threshold used by the UE to determine the coverage enhancement level can be obtained from pre-configured uplink resource configuration information.

Situation 2: The UE MAC layer determines that the size of a latent MAC protocol data unit is greater than the size of a transport block corresponding to the allocated pre-configured uplink resource. Preferably, situation 2 is applicable when a control plane optimization scheme is used.

Situation 3: A TAT timer used to determine an idle state Time Advance (TA) times out, that is, the TAT timer corresponding to the pre-configured uplink resource times out.

Situation 4: The idle state TA determined on the basis of the Reference Signal Received Power (RSRP) is invalid.

Situation 5: The uplink data transmitted on the pre-configured uplink resource encounters a transmission failure, for example, no response from a base station is received, or no confirmation message from the base station for confirming that the base station has correctly received the uplink data is received. Or, Hybrid Automatic Repeat Request (HARQ) transmission for uplink transmission transmitted on the pre-configured uplink resource has reached a maximum count of retransmission.

Situation 6: The count of failures for transmitting the uplink data on the pre-configured uplink resource exceeds a configured threshold.

Embodiment 2

Figure 2:
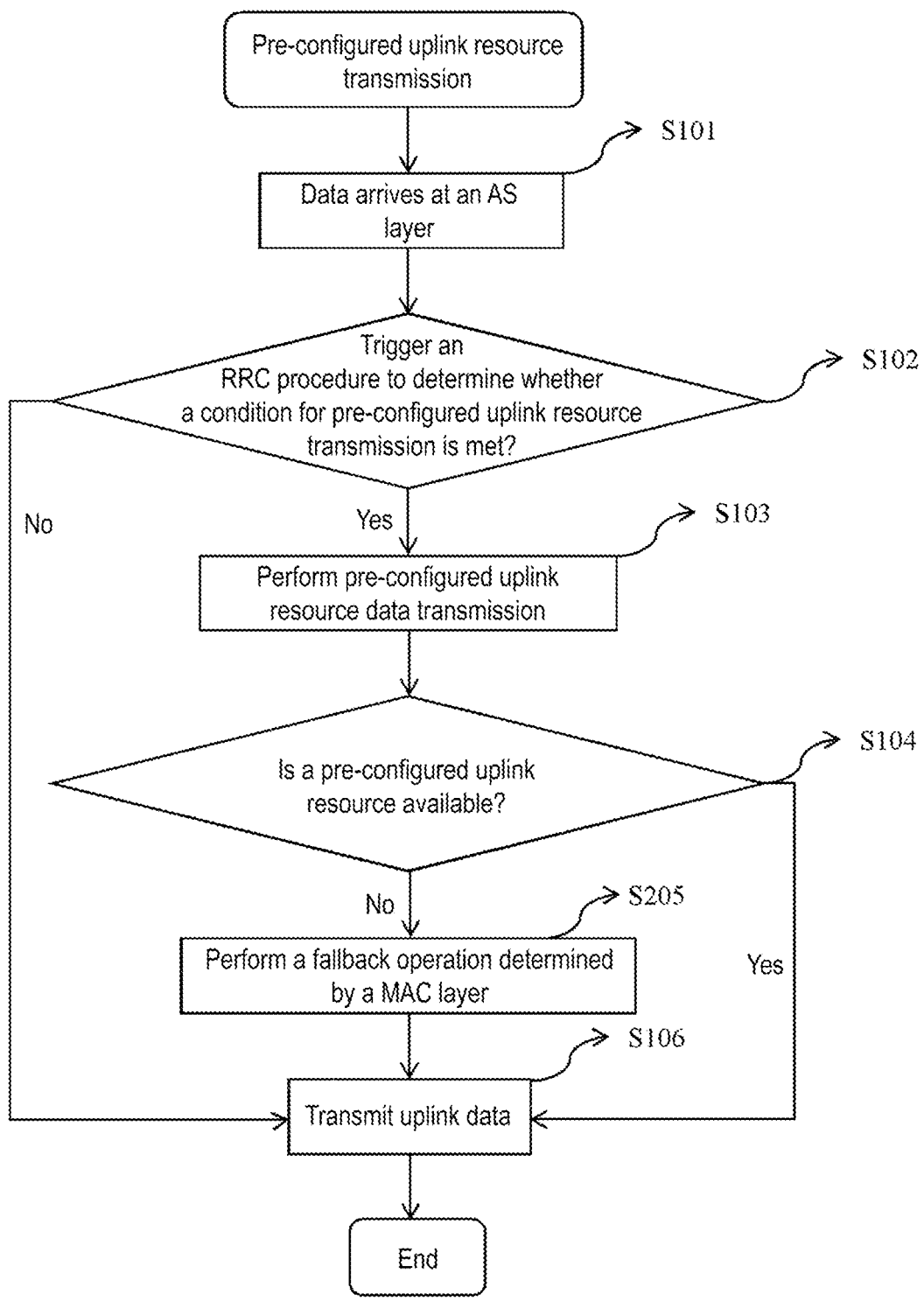
FIG. 2 is a flowchart of pre-configured uplink resource transmission on UE involved in Embodiment 2 of the present disclosure.

Below, FIG. 2 is used to describe another procedure of pre-configured uplink resource transmission on UE.

In this embodiment, steps S101 to 104 and 106 are the same as those in Embodiment 1, and the difference lies only in step S205. Therefore, only step S205 will be described below.

In this embodiment, fallback is performed at a MAC layer of the UE (S205). The difference over Embodiment 1 is that if the MAC layer determines that a pre-configured uplink resource is unavailable, the UE MAC layer triggers a random access procedure as follows: if the size of a latent MAC protocol data unit is not greater than an EDT transport block size configuration (edt-TBS information element) corresponding to a selected coverage enhancement level for EDT received in system information, the MAC layer initiates a random access procedure for EDT. Optionally, the method further includes that the MAC layer transmits indication information to an upper layer to inform the upper layer (such as an RRC layer) that the EDT mode is being used. Otherwise, the MAC layer initiates a conventional random access procedure, that is, initiates a non-EDT random access procedure.

The MAC layer may determine that the pre-configured uplink resource is unavailable in any one of the following situations:
Situation 1: The UE MAC layer determines that there is no pre-configured uplink resource corresponding to a current coverage enhancement level. In this situation, configuration of the pre-configured uplink resource distinguishes among coverage enhancement levels, that is, different pre-configured uplink resources may be configured for different coverage enhancement levels. The UE determines, on the basis of measured RSRP, a coverage enhancement level at which the UE currently is. An RSRP threshold used by the UE to determine the coverage enhancement level can be obtained from pre-configured uplink resource configuration information.
Situation 2: The UE MAC layer determines that the size of a latent MAC protocol data unit is greater than the size of a transport block corresponding to the allocated pre-configured uplink resource. Preferably, situation 2 is applicable when a control plane optimization scheme is used.
Situation 3: A TAT timer used to determine an idle state TA times out, that is, the TAT timer corresponding to the pre-configured uplink resource times out.
Situation 4: The idle state TA determined on the basis of the RSRP is invalid.
Situation 5: The uplink data transmitted on the pre-configured uplink resource encounters a transmission failure, for example, no response from a base station is received, or no confirmation message from the base station for confirming that the base station has correctly received the uplink data is received. Or, HARQ transmission for uplink transmission transmitted on the pre-configured uplink resource has reached a maximum count of retransmission.
Situation 6: The count of failures for transmitting the uplink data on the pre-configured uplink resource exceeds a configured threshold.

Embodiment 3

Figure 3:
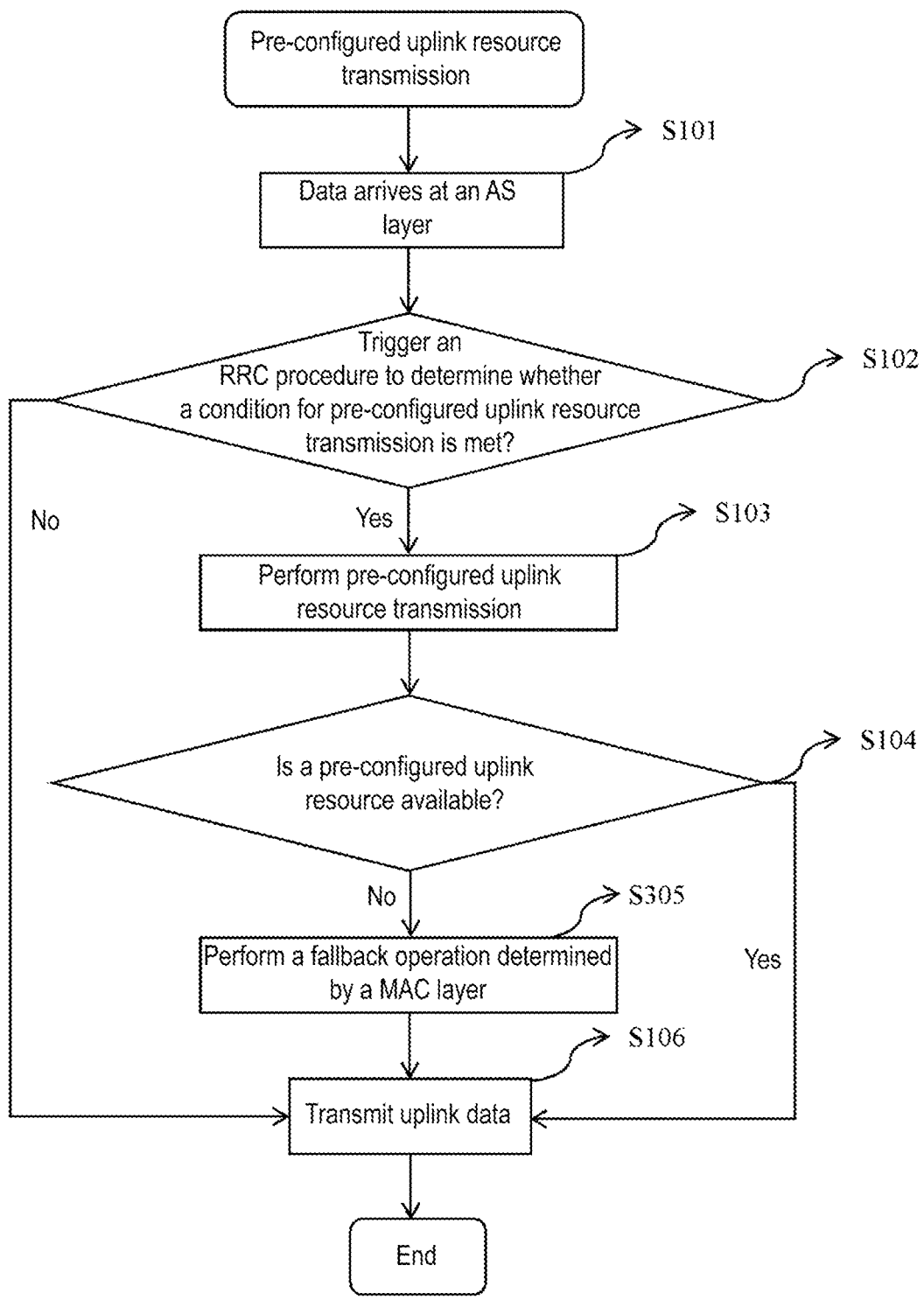
FIG. 3 is a flowchart of pre-configured uplink resource transmission on UE involved in Embodiment 3 of the present disclosure.

Below, FIG. 3 is used to describe another procedure of pre-configured uplink resource transmission on UE.

In this embodiment, steps S101 to 104 and 106 are the same as those in Embodiment 1, and the difference lies only in step S305. Therefore, only step S305 will be described below.

In this embodiment, fallback is determined by an RRC layer (step S305).

1. If a MAC layer determines that a pre-configured uplink resource is unavailable, the UE MAC layer transmits indication information to an upper layer to inform the upper layer (such as the RRC layer) that the pre-configured uplink resource is unavailable. The indication information may also be referred to as a pre-configured uplink resource transmission cancellation indication.

Optionally, the indication information is a cause of that the pre-configured uplink resource is unavailable, for example, transmission on the pre-configured uplink resource fails, or the transmission on the pre-configured uplink resource reaches a maximum count of retransmission, or a TA is invalid, or a MAC protocol data unit size is greater than a transport block size allowed by the pre-configured uplink resource, etc.

2. Upon receiving the pre-configured uplink resource transmission cancellation indication from a lower layer (such as the MAC layer), the RRC layer determines whether an EDT condition is met; if so, the RRC layer configures the lower layer to use EDT; otherwise, the RRC layer performs an operation of falling back to a conventional transmission mode.

The condition for determining whether the EDT condition is met includes the following:
Condition 1: An establishment or resume request is used for a mobile originating call and a cause for establishment is mobile originating data (MO-data) or mobile originating exception data (mo-exception data) or delay tolerant access (delaytolerantAccess).
Condition 2: For control plane EDT, the upper layer requests to establish an RRC connection, and the UE supports the control plane EDT, and system information includes a cp-EDT information element. Or, for user plane EDT, the upper layer requests to resume an RRC connection, the UE supports the user plane EDT, system information 2 includes an up-EDT information element, and the UE has a stored next hop chaining count (nextHopChainingCount) provided in an RRC connection release message with suspension indication received during a moderate suspension procedure.
Condition 3: The system information includes an EDT parameter configuration (i.e., edt-parameters information element).
Condition 4: The size of a formed MAC protocol data unit is less than or equal to a transport block size configured in an edt-TBS information element. The size of the MAC protocol data unit includes all uplink data. The edt-TBS information element is used to include a maximum transport block size of a message 3 corresponding to one PRACH resource when the UE performs EDT transmission.

The operation of falling back to the conventional transmission mode performed by the RRC layer (see section 5.3.3.3c of the protocol specification TS36.331) includes one or a plurality of the following operations:
Operation 1: If the fallback operation corresponds to a control plane optimization scheme, that is, corresponds to an RRC early data request message, initiate transmission of an RRC connection request message.
Operation 2: If the fallback operation corresponds to a user plane optimization scheme, that is, corresponds to an RRC connection resume request message, re-establish a Radio Link Control (RLC) layer corresponding to a Data Radio Bearer (DRB) and/or a Signalling Radio Bearer (SRB).

Operation 3: If the fallback operation corresponds to the user plane optimization scheme, that is, corresponds to the RRC connection resume request message, re-establish a Packet Data Convergence Protocol (PDCP) layer corresponding to the DRB and/or the SRB.

Operation 4: If the fallback operation corresponds to the user plane optimization scheme, that is, corresponds to the RRC connection resume request message, delete a security key derived in the RRC procedure.

Operation 5: If the fallback operation corresponds to the user plane optimization scheme, that is, corresponds to the RRC connection resume request message, suspend all SRBs and DRBs, excluding the first SRB, i.e., SRB0 herein.

Operation 6: If the fallback operation corresponds to the user plane optimization scheme, that is, corresponds to the RRC connection resume request message, configure the lower layer to suspend integrity protection and encryption functions.

Operation 7: Initiate transmission of the RRC connection resume request message, the RRC connection resume request message being not used for EDT.

Embodiment 4

This embodiment also proposes a method for falling back from pre-configured uplink resource transmission to a conventional transmission mode or an EDT mode. This embodiment is different from the assumption of the pre-configured uplink resource transmission made in Embodiments 1 to 3. In Embodiments 1 to 3, the user plane data always triggers an RRC connection establishment/resume procedure, and is accompanied by an RRC request message (such as an RRC connection establishment request, an RRC early data request, or an RRC connection resume request message) to be transmitted on a pre-configured uplink resource. In Embodiment 4, an assumption based upon is that only user plane data is transmitted on a pre-configured uplink resource, without an additional RRC request message.

In this embodiment, the fallback is determined by an RRC layer.

Step 1: If a MAC layer determines that a pre-configured uplink resource is unavailable, the UE MAC layer transmits indication information to an upper layer to inform the upper layer (such as the RRC layer) that the pre-configured uplink resource is unavailable. The indication information may also be referred to as a pre-configured uplink resource transmission cancellation indication.

Optionally, the indication information is a cause of that the pre-configured uplink resource is unavailable, for example, transmission on the pre-configured uplink resource fails, or the transmission on the pre-configured uplink resource reaches a maximum count of retransmission, or a TA is invalid, or a MAC protocol data unit size is greater than a transport block size allowed by the pre-configured uplink resource, etc.

Step 2: Upon receiving the pre-configured uplink resource transmission cancellation indication from a lower layer, the RRC layer determines whether an EDT condition is met; if so, the RRC layer performs the following operation of falling back to EDT; otherwise, the RRC layer performs an operation of falling back to a conventional transmission mode.

Optionally, before the RRC layer determines whether the EDT condition is met, the method further comprises the RRC layer triggering an RRC connection establishment procedure (an RRC procedure used to initially establish or resume an RRC connection).

A condition for determining whether the EDT is met is the same as that in the embodiments above, and will not be described herein again.

The operation of falling back to EDT performed by the RRC layer includes one or a plurality of the following operations:

Operation 1: For a control plane optimization scheme (or control plane EDT), re-establish an RLC corresponding to an SRB. Preferably, the SRB is SRB0.

Operation 2: For a user plane optimization scheme (or user plane EDT), perform transmission of an RRC connection resume request message. The operation 2 is performed under a condition that SRB1 has been resumed. If SRB1 has not been resumed, the operation 2 further includes resuming SRB1. The performing transmission of the RRC connection resume request message means constructing an RRC connection resume request message and submitting the message to the lower layer for transmission. The construction of an RRC connection resume request message includes the following: setting a resumeID field to a stored resume identity (resumeIdentity); setting a resumecause field to information received from the upper layer; setting a shortresumeMAC-I field to the lowest 16 bits of a calculated MAC-I.

The operation of falling back to the conventional transmission mode performed by the RRC (see section 5.3.3.3c of the protocol specification TS36.331) includes one or a plurality of the following operations:

Operation 1: If the fallback operation corresponds to a control plane optimization scheme, that is, corresponds to an RRC early data request message, initiate transmission of an RRC connection request message.

Operation 2: If the fallback operation corresponds to a user plane optimization scheme, that is, corresponds to an RRC connection resume request message, re-establish a Radio Link Control (RLC) layer corresponding to a Data Radio Bearer (DRB) and/or a Signalling Radio Bearer (SRB).

Operation 3: If the fallback operation corresponds to the user plane optimization scheme, that is, corresponds to the RRC connection resume request message, re-establish a Packet Data Convergence Protocol (PDCP) layer corresponding to the DRB and/or the SRB.

Operation 4: If the fallback operation corresponds to the user plane optimization scheme, that is, corresponds to the RRC connection resume request message, delete a security key derived in the RRC procedure.

Operation 5: If the fallback operation corresponds to the user plane optimization scheme, that is, corresponds to the RRC connection resume request message, suspend all SRBs and DRBs, excluding SRB0 herein.

Operation 6: If the fallback operation corresponds to the user plane optimization scheme, that is, corresponds to the RRC connection resume request message, configure the lower layer to suspend integrity protection and encryption functions.

Operation 7: Initiate transmission of the RRC connection resume request message, the RRC connection resume request message being not used for EDT.

Operation 8: Initiate an RRC connection establishment procedure.

Embodiment 5

This embodiment provides a method for UE to process ongoing pre-configured uplink resource transmission when cell reselection occurs.

Step 1: The UE uses a stored pre-configured uplink resource to transmit uplink data. That is, the UE is performing a pre-configured uplink resource-based uplink transmission procedure.

In this step, as mentioned above, the UE RRC layer triggers an RRC connection establishment or RRC connection resume procedure, and determines to use a pre-configured uplink resource transmission mode to transmit the uplink data.

Step 2: The UE performs cell reselection, or cell reselection occurs.

Step 3: The UE performs one or a plurality of the following operations:
- Operation 1: Reset MAC.
- Operation 2: Reestablish RLC entities corresponding to SRBs and/or DRBs.
- Operation 3: Inform upper layers about a failure to establish an RRC connection or failure to resume an RRC connection with suspension indication. Preferably, the operation 3 is performed after all other operations.
- Operation 4: Release a stored or used pre-configured uplink resource configuration.

The above operation 1/2/3 may be performed under the condition that the UE has transmitted an RRC connection resume request message and has not received a corresponding response message, or may be performed under other conditions.

If the UE has transmitted the RRC connection resume request message and has not received the corresponding response message, such as an RRC connection resume message, then the following operation is performed.
- Operation 5: Delete the security keys derived in step 1.
- Operation 6: Suspend all SRBs and/or DRBs. Preferably, the SRBs do not include SRB0.
- Operation 7: Configure the lower layer to suspend integrity protection and encryption functions.

Otherwise, if the condition that the UE has transmitted the RRC connection resume request message and has not received the corresponding response message, then the following operation is performed.
- Operation 8: Release a MAC configuration.

If a T300 timer is started in step 1, then in step 3, an execution condition of the above operation is that T300 is running. The T300 timer is an RRC timer used to monitor an RRC connection establishment/resume procedure. This timer is started when an initial access RRC procedure is initiated, and stopped when a corresponding response message is received. If the timer times out, it is considered that the RRC connection establishment/resume procedure has failed.

Embodiment 6

This embodiment proposes a method for UE to ensure that the latest pre-configured uplink resource request information is delivered to a target base station in a handover procedure.

Step 1: The UE receives a handover command and perform handover.

The handover command refers to an RRC connection reconfiguration message including a mobility control information element (MobilityControlInfo), or an RRC reconfiguration message including a synchronization reconfiguration information element (reconfigurationWithSync). The mobility control information element and the synchronization reconfiguration information element are respectively used in an LTE system and an NR system to carry target cell information for handover.

Step 2: A MAC layer successfully completes a random access procedure. Or if the handover command is configured to not perform random access (i.e., rach-Skip information element), the MAC indicates that a Physical Downlink Control Channel (PDCCH) addressed by a Radio Network Temporary Identifier (RNTI) of the UE has been successfully received.

Step 3: If a target cell of the handover (i.e., a serving cell after the handover) enables transmission of pre-configuration uplink resource request information, and if the UE has transmitted a pre-configured uplink resource request message to a network side in a recent period of time before receiving the handover command, the UE initiates transmission of the pre-configured uplink resource request message to the target cell.

In this step, the target cell enables the transmission of the pre-configured uplink resource request information, which preferably means that the system information includes enabling/configuration information of the pre-configured uplink resource request information. Alternatively, it means that the handover command or an RRC connection reconfiguration message received after the handover is completed includes the enabling/configuration information of the pre-configured uplink resource request information.

Embodiment 7

This embodiment provides a method for UE to transmit pre-configured uplink resource request information.

Step 1: The UE initiates transmission of pre-configured uplink resource request information.

In this step, the UE initiating the transmission of the pre-configured uplink resource request information further includes that if an uplink resource request information prohibition timer is not running, the UE initiates the transmission of the pre-configured uplink resource request information.

Step 2: The UE starts the pre-configured uplink resource request information prohibition timer.

Optionally, the method further includes the following step 3.

Step 3: When the UE initiates an RRC connection reestablishment procedure or the UE performs handover, stop the pre-configured uplink resource request information prohibition timer.

The UE performing the handover means that the UE receives a handover command.

Before step 1, the method further includes that the UE receives a pre-configured uplink resource configuration including a pre-configured uplink resource request information prohibition timer configuration from the base station. The pre-configured uplink resource request information prohibition timer configuration includes at least the value of the pre-configured uplink resource request information prohibition timer.

The prohibition timer defined in this embodiment can achieve the purpose of preventing the UE from transmitting the pre-configured uplink resource request information to the base station too frequently.

Embodiment 8

This embodiment provides a configuration method for a pre-configured uplink resource.

Step 1: UE receives an RRC message including a pre-configured uplink resource configuration from a base station. The RRC message includes a maximum count of HARQ transmission on the pre-configured resource. The maximum count of HARQ transmission may also be a maximum count of HARQ retransmission.

Step 2: The UE performs uplink transmission on the pre-configured uplink resource. When the count of HARQ transmission or HARQ retransmission of the uplink transmission reaches (greater than or greater than or equal to) the maximum count of HARQ transmission or maximum count of HARQ retransmission configured in step 1, the UE considers that the uplink transmission on the pre-configured uplink resource has failed, that is, the UE will stop monitoring scheduling information for retransmission from the base station in a corresponding search space. The search space is a PDCCH search space, and the scheduling information is a PDCCH or Downlink Control Information (DCI) used for scheduling retransmission.

In this embodiment, by timing the maximum count of transmission on the pre-configured uplink resource, power consumption caused by the UE due to unrestricted monitoring of retransmission scheduling is avoided.

Figure 4:
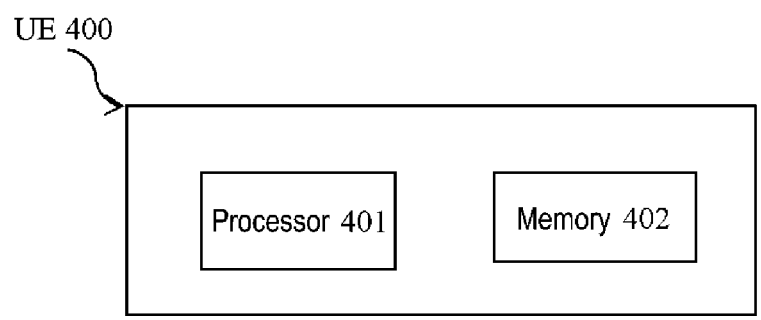
FIG. 4 is a schematic structural block diagram of user equipment involved in the present disclosure.

FIG. 4 is a schematic structural block diagram of User Equipment (UE) related to the present disclosure. As shown in FIG. 4, the UE 400 includes a processor 401 and a memory 402. The processor 401 may, for example, include a microprocessor, a microcontroller, an embedded processor, or the like. The memory 402 may, for example, include a volatile memory (for example, a Random Access Memory (RAM)), a Hard Disk Drive (HDD), a non-volatile memory (for example, a flash memory), or other memories. Program instructions are stored on the memory 402. The instructions, when run by the processor 401, can perform the aforementioned method performed by user equipment described in detail in the present disclosure.

The program running on the device according to the present disclosure may be a program that enables a computer to implement the functions of the embodiments of the present disclosure by controlling a central processing unit (CPU). The program or information processed by the program may be temporarily stored in a volatile memory (for example, a random access memory (RAM)), a hard disk drive (HDD), a non-volatile memory (for example, a flash memory), or other memory systems.

The program for implementing the functions of the embodiments of the present disclosure may be recorded on a computer-readable recording medium. The corresponding functions can be achieved by the computer system through reading programs recorded on the recording medium and executing them. The so-called "computer system" herein may be a computer system embedded in the device, which may include operating systems or hardware (for example, peripherals). The "computer-readable recording medium" may be a semiconductor recording medium, an optical recording medium, a magnetic recording medium, a recording medium for transiently dynamically storing a program, or any other computer-readable recording media.

Various features or functional modules of the device used in the above embodiments may be implemented or executed through circuits (for example, monolithic or multi-chip integrated circuits). Circuits designed to execute the functions described in this description may include general-purpose processors, Digital Signal Processors (DSPs), application-specific integrated circuits (ASICs), Field Programmable Gate Arrays (FPGAs) or other programmable logic devices, discrete gates or transistor logic, or discrete hardware components, or any combination of the above. The general-purpose processor may be a microprocessor, or may be an existing processor, a controller, a microcontroller, or a state machine. The circuit may be a digital circuit or an analog circuit. When new integrated circuit technologies that replace existing integrated circuits emerge because of the advances in semiconductor technology, one or a plurality of embodiments of the present disclosure may also be implemented using these new integrated circuit technologies.

Furthermore, the present disclosure is not limited to the embodiments described above. Although various examples of the described embodiments have been described, the present disclosure is not limited thereto. Fixed or non-mobile electronic devices installed indoors or outdoors, such as AV equipment, kitchen equipment, cleaning equipment, air conditioners, office equipment, vending machines, and other household appliances, may be used as terminal devices or communications devices.

The embodiments of the present disclosure have been described in detail above with reference to the accompanying drawings. However, the specific structures are not limited to the above-mentioned embodiments. The present disclosure also includes any design modifications that do not depart from the main idea of the present disclosure. In addition, various modifications can be made to the present disclosure within the scope of the claims. Embodiments resulting from the appropriate combinations of the technical means disclosed in different embodiments are also included within the technical scope of the present disclosure. In addition, components with the same effect described in the embodiments above may be replaced with one another.

The invention claimed is:

1. A control method in a User Equipment (UE), comprising: initiating transmission of a Radio Resource Control (RRC) connection resume request message in response to determining that the UE is resuming an RRC connection, wherein the UE uses a pre-configured uplink resource (PUR) to transmit uplink data; deriving security keys; and performing the following actions in response to determining that (i) a cell reselection has occurred, (ii) a timer T300 has been running, and (iii) the UE has not received a corresponding response message after transmitting the RRC connection resume request message: resetting a Medium Access Control (MAC); deleting the derived security keys; re-establishing Radio Link Control (RLC) entities for at least one Signaling Radio Bearer (SRB) and at least one Data Radio Bearer (DRB); suspending the at least one SRB and the at least one DRB except a first SRB (SRB0); configuring lower layers to suspend an integrity protection and a ciphering function; and informing upper layers about a failure to establish the RRC connection or failure to resume the RRC connection with a suspend indication.

2. A User Equipment (UE), comprising: a processor; and a memory, wherein the memory stores instructions that, when executed by the processor, cause the processor to: initiate transmission of a Radio Resource Control (RRC) connection resume request message in response to determining that the UE is resuming an RRC connection, wherein the UE uses a pre-configured uplink resource (PUR) to transmit uplink data; derive security keys; and perform following actions in response to determining that (i) a cell reselection has occurred, (ii) a timer T300 has been running, and (iii) the UE has not received a corresponding response message after transmitting the RRC connection resume request message: reset a Medium Access Control (MAC); delete the derived security keys; re-establish Radio Link Control (RLC) entities for at least one Signaling Radio Bearer (SRB) and at least one Data Radio Bearer (DRB); suspend the at least one SRB and the at least one DRB except a first SRB (SRB0); configure lower layers to suspend an integrity protection and a ciphering function; and inform upper layers about a failure to establish the RRC connection or failure to resume the RRC connection with a suspend indication.

* * * * *